(12) United States Patent
Yokouchi et al.

(10) Patent No.: US 8,950,799 B2
(45) Date of Patent: Feb. 10, 2015

(54) WINDBREAK STRUCTURE FOR SADDLE TYPE VEHICLE

(71) Applicant: Honda Motor Co., Ltd., Tokyo (JP)

(72) Inventors: Kohei Yokouchi, Wako (JP); Tomotake Shimoji, Wako (JP); Hiroyuki Sasazawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/841,323

(22) Filed: Mar. 15, 2013

(65) Prior Publication Data

US 2013/0249238 A1  Sep. 26, 2013

(30) Foreign Application Priority Data

Mar. 22, 2012  (JP) .................... 2012-064849

(51) Int. Cl.
*B62J 17/06* (2006.01)
*B62J 17/04* (2006.01)

(52) U.S. Cl.
CPC ...... *B62J 17/06* (2013.01); *B62J 17/04* (2013.01); *B62K 2202/00* (2013.01)
USPC ...................... 296/180.1; 296/78.1

(58) Field of Classification Search
CPC ............ B62J 17/04; B62J 17/02; B62J 17/06; B62J 17/065; B62J 15/02; B62J 23/00
USPC ............. 454/125, 136; 296/180.1, 78.1, 37.1; 180/68.1
See application file for complete search history.

(56) References Cited

U.S. PATENT DOCUMENTS

| 7,137,722 B2 * | 11/2006 | Uemoto et al. | 362/473 |
| 2009/0250963 A1 * | 10/2009 | Nakamura | 296/78.1 |

FOREIGN PATENT DOCUMENTS

JP   10-203454 A   8/1998

* cited by examiner

*Primary Examiner* — Joseph D Pape
*Assistant Examiner* — Dana Ivey
(74) *Attorney, Agent, or Firm* — Birch, Stewart, Kolasch & Birch, LLP (57) ABSTRACT

A windbreak structure for a saddle type vehicle to provide an increase in the windshield effect behind a leg shield. Exhaust ports for letting a flow of air from the front of a vehicle body rearwardly are provided at a side end portion of a leg shield. Further, sideward covering portions are provided that serve as exhaust air guide portions that extend rearwardly on the inner side in a vehicle widthwise direction of the exhaust port.

20 Claims, 11 Drawing Sheets

WINDBREAK STRUCTURE FOR SADDLE TYPE VEHICLE

CROSS-REFERENCE TO RELATED APPLICATIONS

The present application claims priority under 35 USC 119 to Japanese Patent Application No. 2012-064849 filed Mar. 22, 2012 the entire contents of that are hereby incorporated by reference.

BACKGROUND OF THE INVENTION

1. Field of the Invention

The present invention relates to a windbreak structure for a saddle type vehicle that has a leg shield for covering the feet of an occupant from the front.

2. Description of Background Art

Some saddle type vehicles such as motorcycles have a leg shield that covers the feet of an occupant from the front. A vehicle of the type described has been proposed wherein a flow of air from the front of the vehicle body is introduced into a duct through an inlet port perforated in the front face of a front cover and is blown out to side end portions of the leg shield from the duct. See, for example, Japanese Patent Laid-Open No. Hei 10-203454. By blowing out a flow of air to the side end portions of the leg shield in this manner, catch-up of a flow of air to the occupant side can be suppressed and the space below the feet can be prevented from being placed into a negative pressure state. Consequently, a windshield effect for the occupant can be raised.

However, in the conventional configuration, a plurality of ducts are provided in a flat region of the leg shield. Therefore, the amount of air to a central portion in the forward and backward direction of the vehicle positioned behind the leg shield is insufficient, and there is the possibility that the area wherein a catch-up of a flow of air can be prevented behind the leg shield may be narrowed.

SUMMARY AND OBJECTS OF THE INVENTION

The present invention has been made in view of the situation described above, and it is an object of an embodiment of the present invention to provide a windbreak structure for a saddle type vehicle by which a windshield effect behind a leg shield can be raised.

In order to solve the problem described above, according to an embodiment of the present invention, there is provided a windbreak structure for a saddle type vehicle that has a leg shield (601) for covering the feet of an occupant from the front, wherein an exhaust port (641) for letting a flow of air from the front of a vehicle body to flow rearwardly is provided at a side end portion of the leg shield (601). In addition, an exhaust air guide portion (602A1) that extends rearwardly is provided on the inner side in a vehicle widthwise direction of the exhaust port (641). With this configuration, the exhaust port for letting a flow of air from the front of the vehicle body to flow rearwardly is provided at the side end portion of the leg shield, and the exhaust air guide portion that extends rearwardly is provided on the inner side in the vehicle widthwise direction of the exhaust port. Therefore, a flow of air to the rear from the exhaust port can be guided along the exhaust air guide portion to smoothly flow rearwardly. Consequently, the area wherein a catch up of a flow of air can be prevented can be expanded rearwardly, and the windshield effect behind the leg shield can be enhanced.

In the configuration described above, an accommodation case (611) may be provided on the inner side of the exhaust port (641) in the vehicle widthwise direction and protrudes rearwardly farther than the exhaust port (641), and a vehicle body cover (C) for covering the accommodation case (611) from the outer sides may configure the exhaust air guide portion (602A1). With this configuration, the vehicle body cover that covers the accommodation case from the outer side can be used also as the exhaust air guide portion, and the exhaust air guide portion can be provided without increasing the number of parts.

Further, in the configuration described above, the accommodation case (611) may protrude forwardly farther than the exhaust port (641), and an air guide path for introducing a flow of air to the exhaust port (641) may be formed by a side wall of the accommodation case (611) and the vehicle body cover (C). With this configuration, the air guide path can be formed simply and readily making use of the gap formed between the accommodation case and the vehicle body cover.

Further, in the configuration described above, the leg shield (601) may have a V-shape that expands upwardly and downwardly toward the rear as viewed in side elevation of the vehicle body, and the exhaust port (641) may be a space that is provided on an upper side portion (602A) of the leg shield (601) extending rearwardly upwardly and is directed downwardly behind the exhaust port (641). With this configuration, a flow of air going out from the exhaust port can be expanded rearwardly downwardly to flow rearwardly, and the windshield effect can be expanded upwardly and downwardly.

Further, in the configuration described above, a fastening portion (BT) for fastening the leg shield (601) and the vehicle body cover (C) on the front face side of the leg shield (601) to each other may be provided on the exhaust port (641). With this configuration, the fastening portion for fastening the leg shield and the vehicle body cover to each other can be disposed inconspicuously and can be made less likely to be viewed from an occupant.

Further, in the configuration described above, lamp units (62U, 63U) of a headlamp (62) and a directional indicator (63) may be provided in front of the leg shield (601) and have a rear face that comes upwardly toward the rear. With this configuration, a flow of air from the front of the vehicle body can be made easily to flow rearwardly of the lamp units, and the flow of air can flow smoothly to the exhaust port positioned rearwardly of the lamp units.

Further, in the configuration described above, a vertical fin (643) may be provided on the exhaust port (641). With this configuration, a flow of air passing the exhaust port can be rectified to an arbitrary direction in the vehicle widthwise direction, and also it is possible to make the opening of the exhaust port less likely to be viewed from the outside of the vehicle.

According to an embodiment of the present invention, the exhaust port for letting a flow of air from the front of the vehicle body flow to the rear is provided at the side end portion of the leg shield for covering the feet of an occupant from the front. The exhaust air guide portion that extends rearwardly is provided on the inner side in the vehicle widthwise direction of the exhaust port. Therefore, a flow of air to let air flow to the rear from the exhaust port can be guided along the exhaust air guide portion to smoothly flow rearwardly. Consequently, the area wherein catching up of a flow of air can be prevented can be expanded rearwardly. Thus, the windshield effect behind the leg shield can be enhanced.

Where the accommodation case is provided on the inner side of the exhaust port in the vehicle widthwise direction and protrudes rearwardly farther than the exhaust port and the vehicle body cover for covering the accommodation case from the outer sides configures the exhaust air guide portion, the vehicle body cover that covers the accommodation case from the outer side can be used also as the exhaust air guide portion, and the exhaust air guide portion can be provided without increasing the number of parts.

Where the accommodation case protrudes forwardly farther than the exhaust port and the air guide path for introducing a flow of air to the exhaust port is formed by the side wall of the accommodation case and the vehicle body cover, the air guide path can be formed simply and readily making use of the gap formed between the accommodation case and the vehicle body cover.

Further, where the leg shield has a V-shape that expands upwardly and downwardly toward the rear as viewed in side elevation of the vehicle body and the exhaust port is the space that is provided on the upper side portion of the leg shield extending rearwardly downwardly and is directed downwardly behind the exhaust port, a flow of air going out from the exhaust port can be expanded rearwardly downwardly to flow rearwardly. Thus, the windshield effect can be expanded upwardly and downwardly.

Further, where the fastening portion for fastening the leg shield and the vehicle body cover on the front face side of the leg shield to each other is provided on the exhaust port, the fastening portion for fastening the leg shield and the vehicle body cover to each other can be disposed inconspicuously and can be made less likely to be viewed from an occupant.

Further, where the lamp units of the headlamp and the directional indicator (63) are provided in front of the leg shield and have the rear face that comes upwardly toward the rear, a flow of air from the front of the vehicle body can be made easily flow rearwardly of the lamp units. Thus, the flow of air can flow smoothly to the exhaust port positioned rearwardly of the lamp units.

Further, where the vertical fin is provided on the exhaust port, a flow of air passing the exhaust port can be rectified to an arbitrary direction in the vehicle widthwise direction. In addition, it is also possible to make the opening of the exhaust port less likely to be viewed from the outside of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings that are given by way of illustration only, and thus are not limitative of the present invention, and wherein.

DETAILED DESCRIPTION OF THE PREFERRED EMBODIMENTS

In the following, an embodiment of the present invention is described with reference to the drawings. It is to be noted that, unless otherwise specified, expressions of directions such as forward and backward, leftward and rightward, and upward and downward directions are the same as the directions with reference to the vehicle body. Further, reference character FR in the figures indicates the forward direction of the vehicle body, reference character UP indicates the upward direction of the vehicle body, and reference character LE indicates the leftward direction of the vehicle body.

Figure 1:
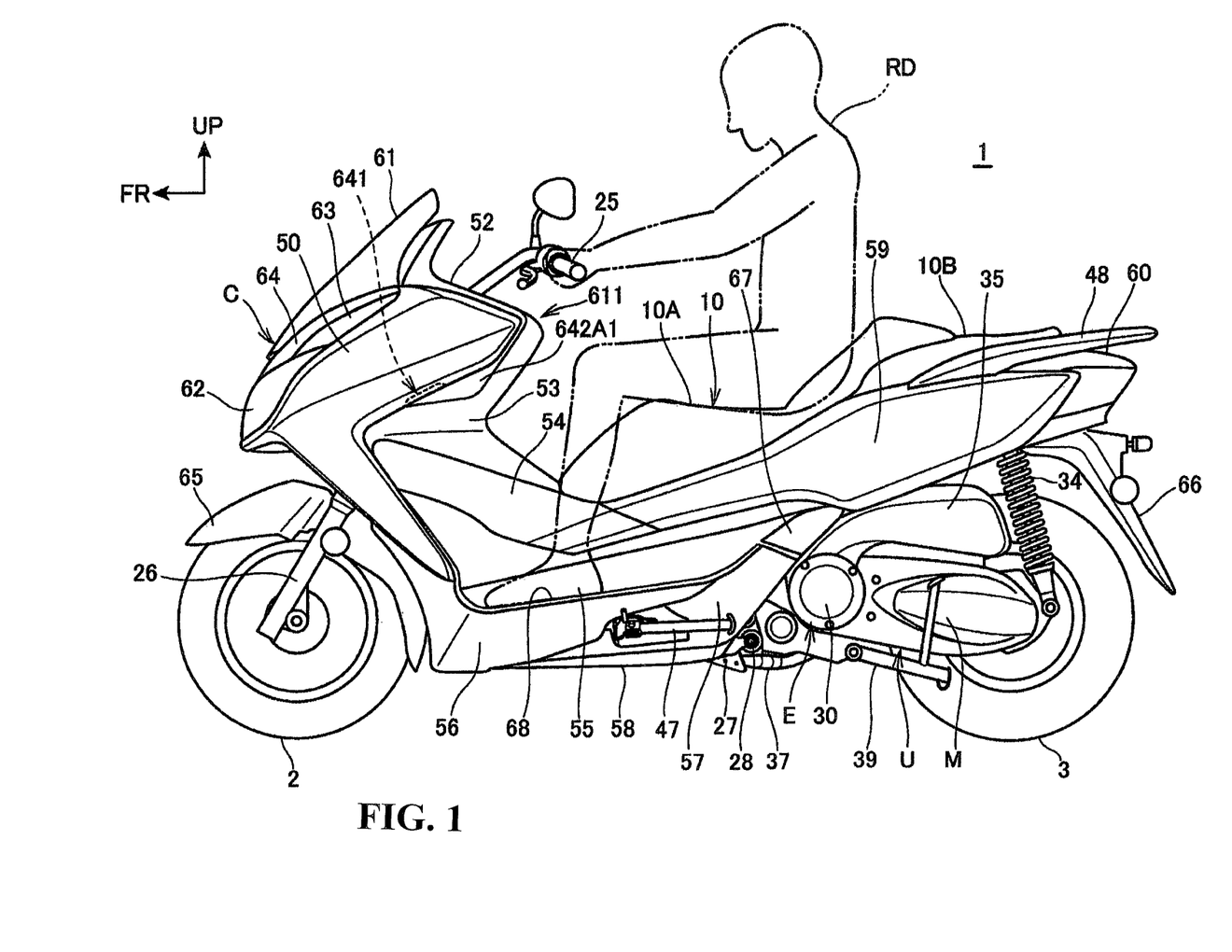
FIG. 1 is a left side elevational view of a motorcycle according to an embodiment of the present invention.

FIG. 1 is a left side elevational view of a motorcycle according to an embodiment of the present invention.

The motorcycle (saddle type vehicle) 1 is a scooter type vehicle having a step floor 68 of the low floor type on that an occupant RD (rider) seated on a seat 10 is to place his/her feet. The motorcycle 1 has a front wheel 2 at a front portion of a vehicle body frame F (FIG. 2), and a rear wheel 3 that is a driving wheel is supported for rotation on a unit swing engine U (unit swing power unit) disposed at a rear portion of the vehicle. The vehicle body frame F is covered with a vehicle body cover C made of resin.

Figure 2:
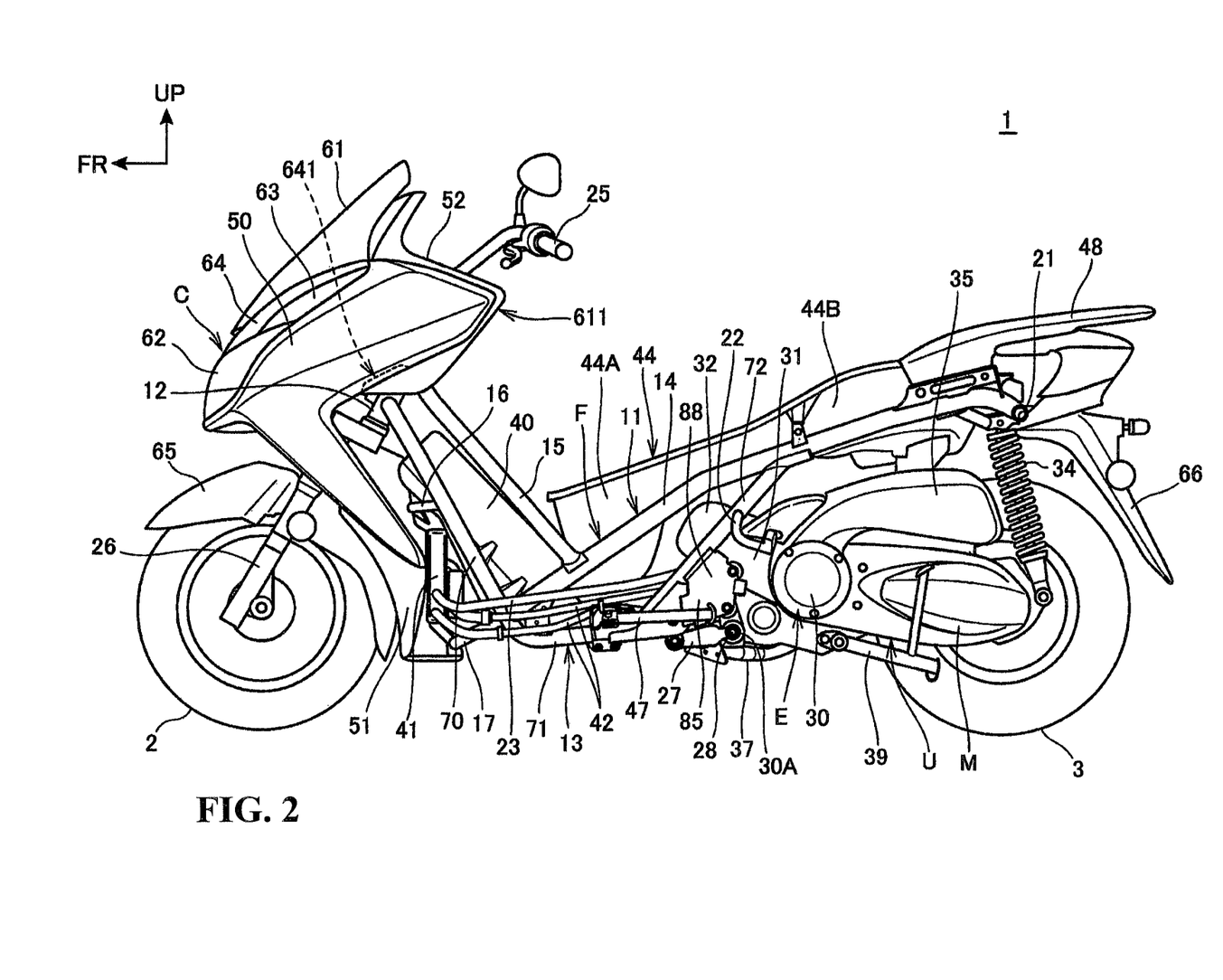
FIG. 2 is a left side elevational view showing an internal structure of the motorcycle.
Figure 3:
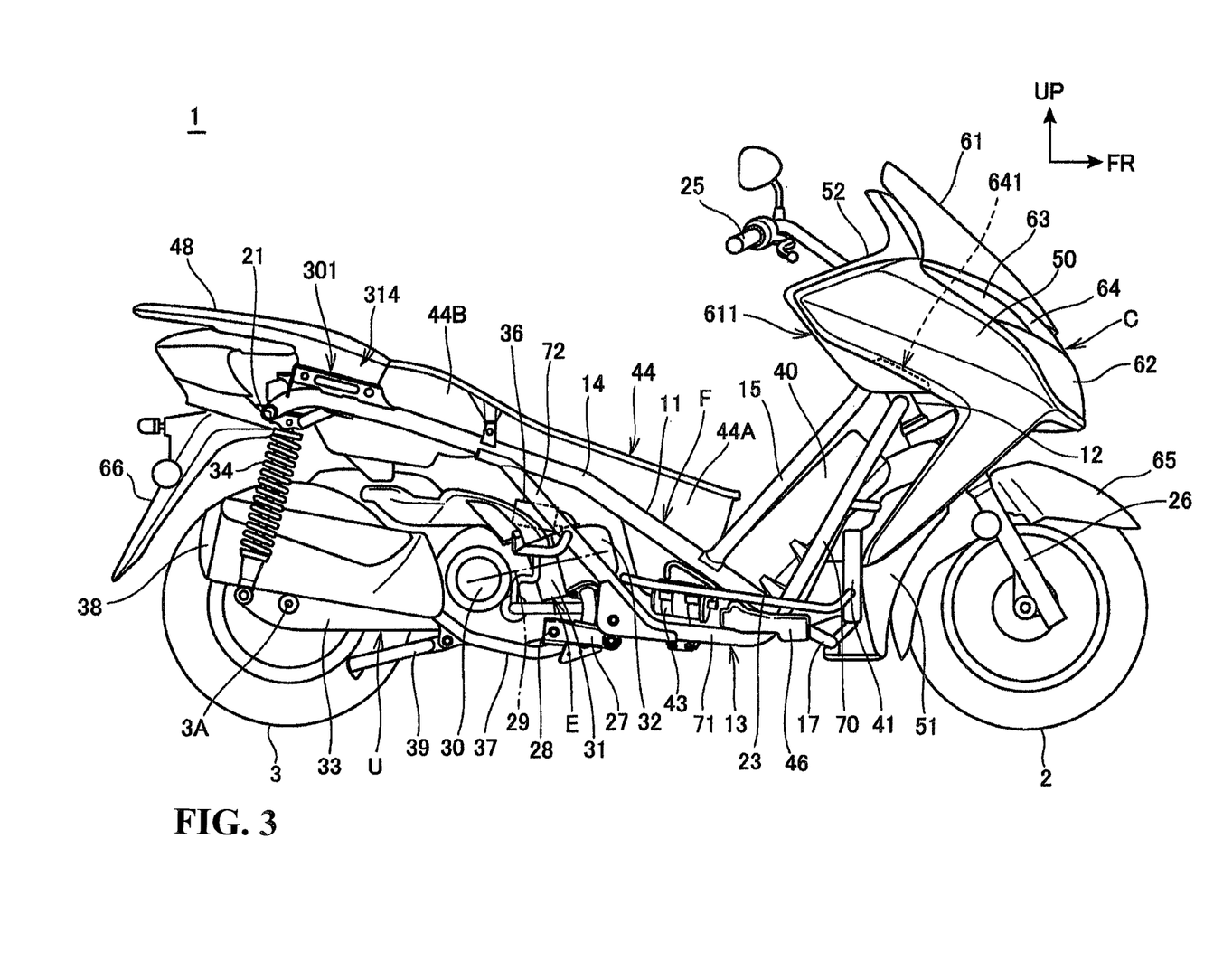
FIG. 3 is a right side elevational view showing the internal structure of the motorcycle.
Figure 4:
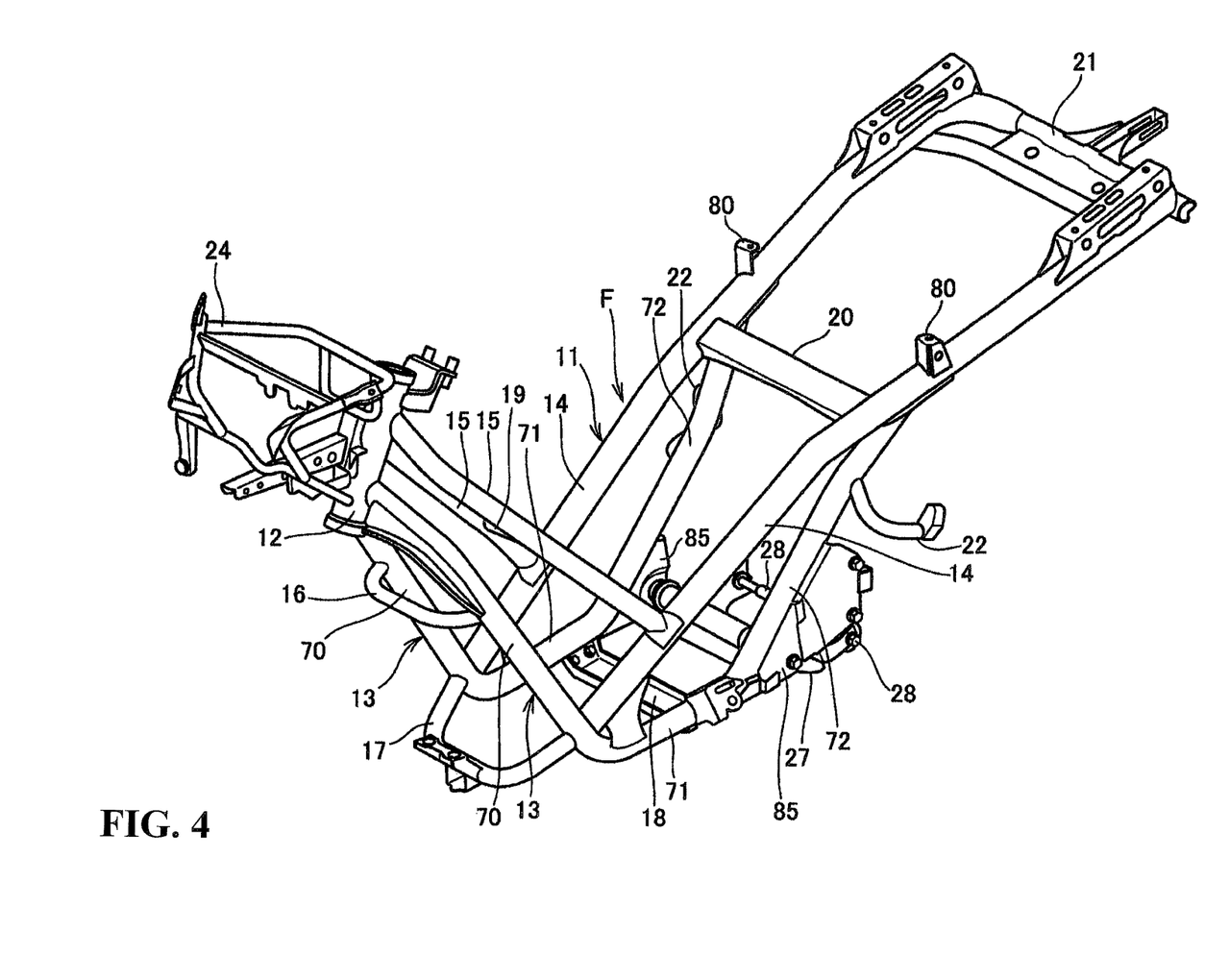
FIG. 4 is a perspective view of a vehicle body frame.

As shown in FIGS. 2 to 4, the vehicle body frame F is formed by connecting a plurality of tubes or pipes made of metal to each other by welding. A main frame 11 has a head pipe 12 provided at a front portion, and a pair of left and right down tubes 13, 13 that extends rearwardly downwardly from the head pipe 12 and then extends substantially horizontally rearwardly and further extends rearwardly upwardly at a rear portion. The main frame 11 further has a pair of left and right seat rails 14, 14 extending rearwardly upwardly from a front lower portion of the down tubes 13, 13 to a rear portion of the vehicle, and a pair of left and right upper tubes 15, 15 extending rearwardly downwardly above the down tubes 13, 13 from the head pipe 12 and connected to the seat rails 14, 14.

The down tubes 13, 13 have a downwardly extending portion 70 connected at a front portion thereof to the head pipe 12 and extending rearwardly downwardly, a horizontally extending portion 71 extending substantially horizontally rearwardly from a lower end of the downwardly extending portion 70, and an obliquely upwardly extending portion 72 extending rearwardly upwardly from a rear end of the horizontally extending portion 71.

As shown in FIG. 4, the main frame 11 has cross members that connect the left and right frames to each other. The cross members include a front upper cross member 16 that connects upper end portions of the downwardly extending portions 70 of the down tubes 13, 13, a front cross member 17 that connects lower portions of the downwardly extending portions 70 to each other, and a horizontal portion cross member 18 that connects the horizontally extending portions 71, 71 of the down tubes 13, 13 to each other. The cross members further include an upper cross member 19 that connects the upper tubes 15, 15 to each other, an intermediate cross member 20 that connects the seat rails 14, 14 to each other, and a rear cross member 21 that connects rear portions of the seat rails 14, 14. The horizontal portion cross member 18 is connected to the horizontally extending portions 71, 71 by bolting.

A pair of left and right tandem step stays 22, 22 are provided at an upper portion of the obliquely upwardly extending portions 72, 72 of the down tubes 13, 13 in such a manner so as to extend to the outer sides in the vehicle widthwise direction.

A basket-like front frame 24 is connected to a front face of the head pipe 12 and supports lamps, the vehicle body cover C and so forth thereon.

Further, a pair of left and right step frames 23 (FIGS. 2 and 3) are provided on the outer sides of the main frame 11 and extend forwardly and backwardly, and support the step floor 68 thereon from below.

As shown in FIGS. 1 to 3, a steering system for steering the front wheel 2 includes a steering shaft (not shown) supported for pivotal motion on the head pipe 12, and a handlebar 25 connected to an upper portion of the steering shaft. The steering shaft is connected at a lower end thereof to a pair of left and right front forks 26, 26, and the front wheel 2 is supported for rotation at a lower end of the front forks 26, 26 and is steered by an operation of the handlebar 25.

The unit swing engine U is of the unit swing type wherein an engine E and a transmission case M with a belt type continuously variable transmission being accommodated are integrated. The unit swing engine U functions as a swing arm for supporting the rear wheel 3 thereon. The unit swing engine U is connected to a rear portion of the down tubes 13, 13 through a link member 27 connected to a front portion thereof and is upwardly and downwardly swingable around a pivot shaft 28 provided on the link member 27. It is to be noted that the link member 27 is connected at a front end thereof to a rear portion of the down tubes 13, 13 through a pair of left and right power unit supporting portions 85, 85.

The engine E is a water-cooled four-cycle single cylinder engine and is disposed such that a cylinder axial line 29 thereof extends substantially horizontally forwardly. The engine E is configured by coupling a cylinder 31 and a cylinder head 32 to a front face of a crankcase 30 disposed at a front portion of the unit swing engine U.

The transmission case M extends rearwardly from a rear portion of the crankcase 30 passing the left side of the rear wheel 3. An arm portion 33 (FIG. 3) is provided at a rear portion of the crankcase 30 and extends rearwardly passing the right side of the rear wheel 3. The rear wheel 3 is supported on an axle 3A provided between a rear portion of the transmission case M and a rear portion of the arm portion 33. Output power of the engine E is transmitted to the rear wheel 3 through the continuously variable transmission.

A pair of left and right rear shock absorbers 34, 34 extend between rear ends of the transmission case M and arm portion 33 and the seat rails 14, 14.

An air cleaner box 35 (FIGS. 1 and 2) for taking in external air is provided on an upper face of the transmission case M. The air cleaner box 35 is connected to a throttle body 36 (FIG. 3) connected to an intake port on an upper face of the cylinder head 32 by a connecting tube not shown.

An intake pipe 37 is connected to an exhaust port on a lower face of the cylinder head 32, extends rearwardly passing below the engine E, and is connected to a muffler 38 (FIG. 3) fixed to an outer side (right side) of the arm portion 33.

A main stand 39 is provided at a lower portion of a rear portion of the transmission case M for supporting the vehicle in an upwardly erected state.

The fuel tank 40 for reserving fuel for the engine E is formed such that the fuel tank 40 extends at a front face thereof along the downwardly extending portion 70 of the down tube 13 and at a rear face thereof along the upper tube 15. In the upward and downward direction, the fuel tank 40 extends long from the rear of a lower portion of the head pipe 12 to the proximity of the horizontally extending portion 71 of the down tube 13. The fuel tank 40 is disposed in a forwardly inclined relationship between the left and right down tubes 13, 13.

In a space below a front portion of the forwardly inclined fuel tank 40, a plate-shaped radiator 41 for cooling the cooling water for the engine E is provided. A pair of cooling water pipes 42 (FIG. 2) connect the radiator 41 and the engine E to each other and extend from a left end portion of the radiator 41. Further, the cooling water pipes 42 extend rearwardly below the step frame 23 (FIG. 2) on the left side (one side) of the vehicle and are connected to the engine E passing the inner side of the down tube 13.

A side stand 47 is attached to the left side horizontally extending portion 71.

A reservoir tank 46 (FIG. 3) for reserving part of the cooling water for the radiator 41 is disposed below the step frame 23 on the right side (the other side) of the vehicle behind the radiator 41. In addition, a canister 43 (FIG. 3) for absorbing evaporated fuel of the fuel tank 40 is provided below the step frame 23 on the right side behind the reservoir tank 46.

An accommodation box 44 (FIGS. 2 and 3) for accommodating an article therein is attached to the seat rails 14, 14 through box stays 80, 80 (FIG. 4) provided on the seat rails 14, 14. The accommodation box 44 is disposed between the seat rails 14, 14 and extends rearwardly upwardly along the seat rails 14, 14 from the proximity of a rear portion of the fuel tank 40 to above the transmission case M. The accommodation box 44 is formed integrally by resin molding from a front accommodating portion 44A disposed between the fuel tank 40 and the obliquely upwardly extending portion 72 of the down tube 13 and a rear accommodating portion 44B disposed above the unit swing engine U.

The accommodation box 44 is open at an upper face over an overall length thereof, and this opening is closed up by the seat 10 (FIG. 1) for an occupant such that the accommodation box 44 can be opened and closed. The seat 10 includes a front seat 10A on which the rider is to be seated, and a rear seat 10B that is formed higher by one stage than the front seat 10A and on which a passenger is to be seated.

At a rear portion of the seat rails 14, 14 behind the accommodation box 44, a grab rail 48 is fixed.

As shown in FIG. 1, the vehicle body cover C includes a front cover 50 that covers the head pipe 12 from the front and the left and right sides and extends downwardly in front of the downwardly extending portion 70, and a front lower cover 51 (FIGS. 2 and 3) connected to a lower portion of the front cover 50. The vehicle body cover C further includes an upper cover 52 connected to an upper portion of the front cover 50 below the handlebar 25, an upper inner cover 53 that covers the head pipe 12, the upper tubes 15, 15 and the downwardly extending portion 70 from the rear and from the sides connected to left and right edge portions of the front cover 50. In addition, a pair of left and right lower inner covers 54, 54 are provided and connected to a lower edge of the upper inner cover 53 for covering the upper tubes 15, 15 and the downwardly extending portion 70. The vehicle body cover C further includes a pair of left and right step covers 55, 55 connected to a lower portion of the front cover 50 and a lower edge of the lower inner covers 54, 54 and covering the step frames 23, 23 from above, and a pair of left and right front floor skirts 56, 56 connected to a lower portion of the front cover 50 and a lower portion of the step covers 55, 55 and covering the step frames 23, 23 from the side. The vehicle body cover C further includes a pair of left and right rear floor skirts 57, 57 extending rearwardly continuing to the front floor skirts 56, 56 and covering the down tubes 13, 13, and a pair of left and right body side covers 59, 59 connected to a rear portion of the lower inner covers 54, 54 and the step covers 55, 55 and covering the accommodation box 44 and the seat rails 14, 14 from the sides below the seat 10. The vehicle body cover C further includes a tail cover 60 connected to a rear portion of the body side covers 59, 59.

On the bottom of the left and right step covers 55, 55, the step floors 68 on which the rider seated on the front seat 10A is to place his/her feet are formed.

A windscreen 61 is provided at a front portion of the front cover 50 and extends rearwardly upwardly. A headlamp 62 is provided at a front end of the front cover 50, and a pair of left and right directional indicators 63, 63 are provided continuously to an upper portion of the headlamp 62. A garnish 64 in the form of a plate is provided between the headlamp 62 and the windscreen 61.

A front fender 65 is provided on the front forks 26, 26 and covers the front wheel 2 from above. A rear fender 66 is provided below the body side covers 59, 59 and covers the rear wheel 3 from above.

A pair of fold-down tandem steps 67 (FIG. 1) on which a passenger seated on the rear seat 10B is to place his/her feet are supported by tandem stays, 22, 22.

Figure 5:
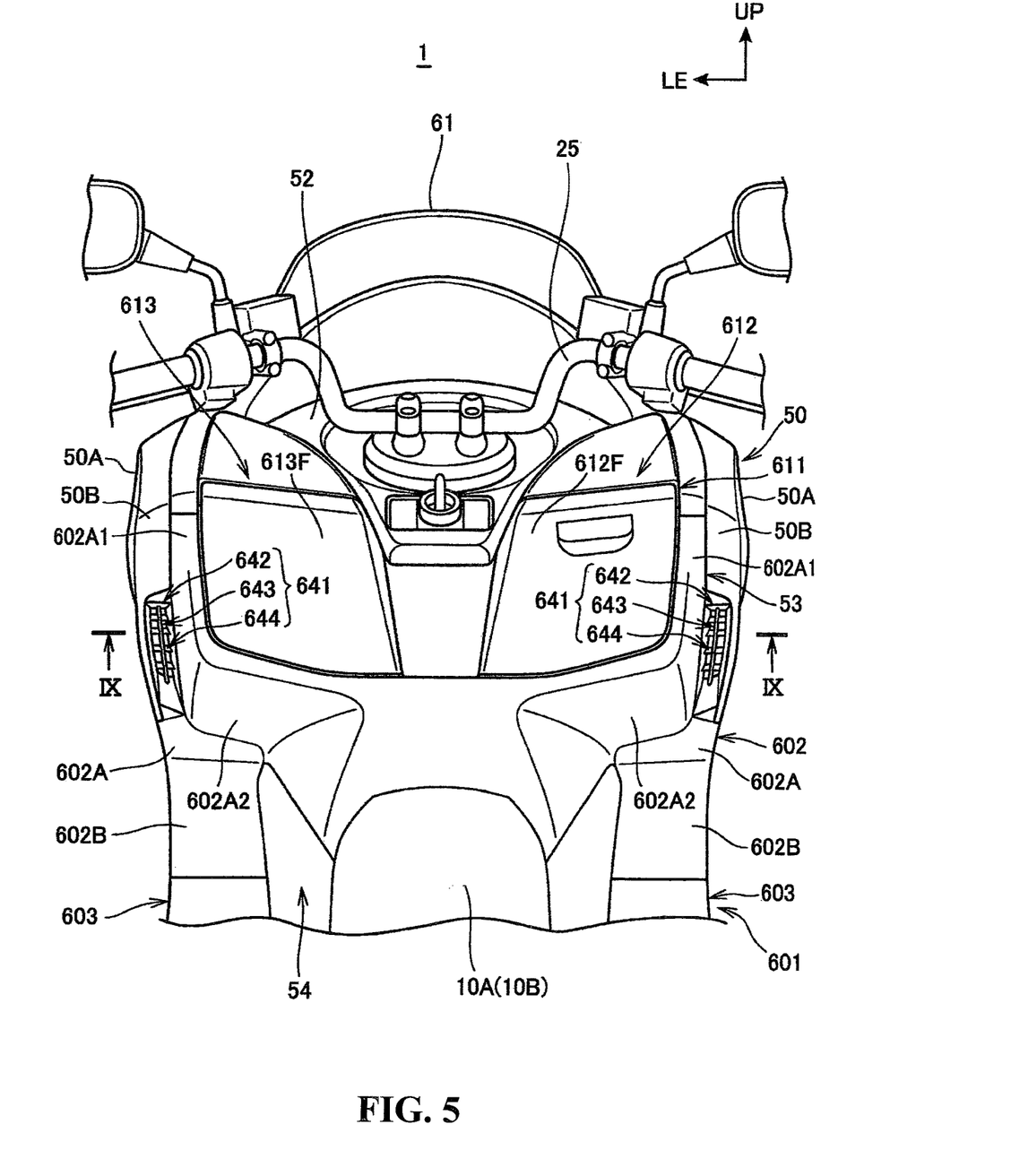
FIG. 5 is a view of a front portion of the vehicle body as viewed from the rear side.
Figure 6:
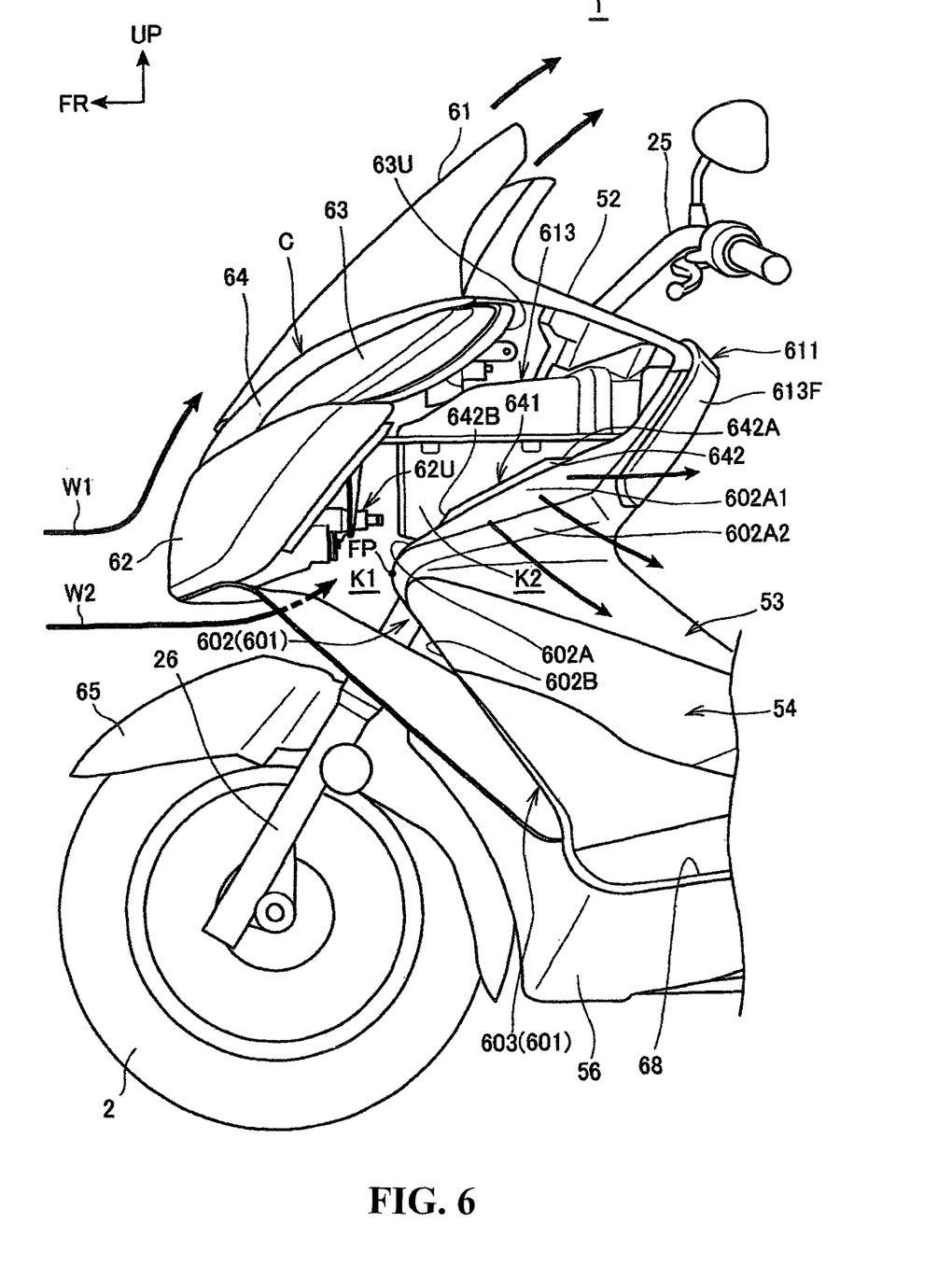
FIG. 6 is a view of the front portion of the vehicle body as viewed from the left side.
Figure 7:
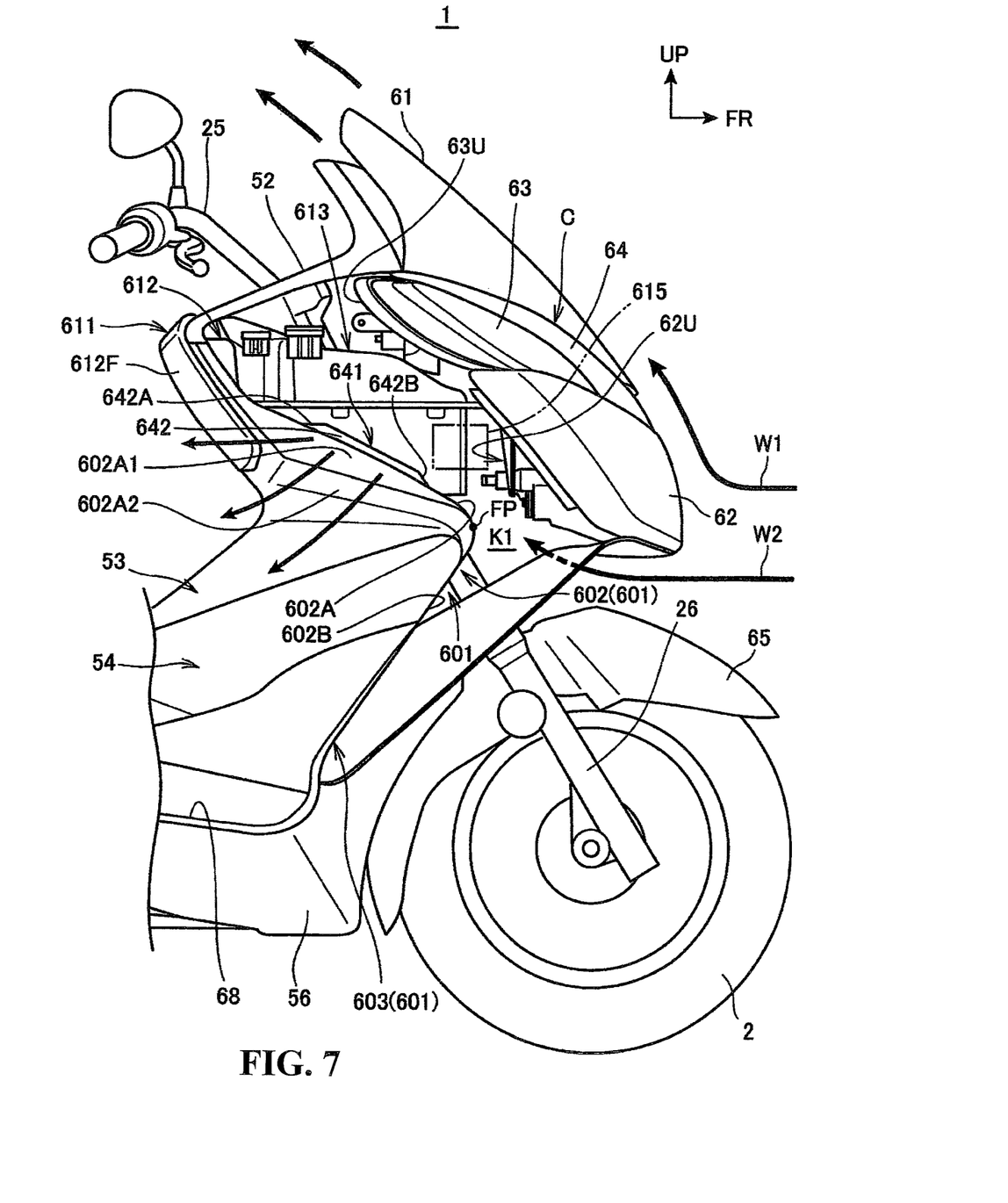
FIG. 7 is a view of the front portion of the vehicle body as viewed from the right side.

As shown in FIGS. 5 to 7, the upper inner cover 53 and the lower inner covers 54, 54 protrude to the outer sides in the vehicle widthwise direction farther than the seat 10 in front of the occupant RD (FIG. 1). The protruding portions contact upwardly and downwardly with each other without a gap therebetween thereby to form a leg shield 601 that covers the feet of the occupant RD from the front. It is to be noted that, in FIGS. 6 and 7, the front cover 50 is not shown.

In short, the upper inner cover 53 configures the left and right upper leg shields 602 that cover a region around the knees of the occupant RD from the front. The lower inner covers 54, 54 configure a lower leg shield 603 that covers the toes of the feet of the occupant RD from the front. The upper and lower leg shields 602 and 603 form the leg shield 601 of a large size that covers the front of the entire feet of the occupants over a region from above to below.

Figure 8:
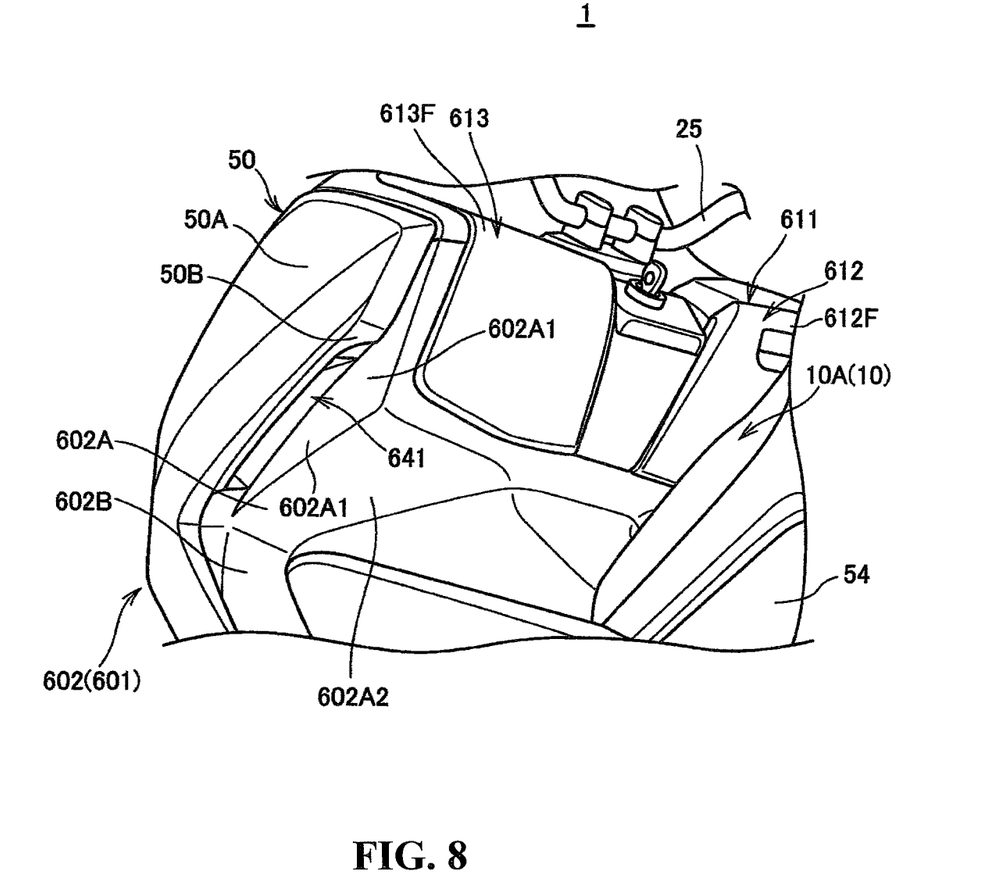
FIG. 8 is a perspective view showing an upper leg shield together with peripheral components.

FIG. 8 shows a perspective view of the upper leg shield 602 as viewed from obliquely below together with peripheral components of the same.

As shown in FIGS. 6 to 8, the upper leg shield 602 is formed as a V-shaped cover that expands upwardly and downwardly toward the rear as viewed in side elevation. More particularly, the upper leg shield 602 integrally has an upper side portion 602A extending rearwardly upwardly from the front end FP (FIGS. 6 and 7) and a lower side portion 602B extending rearwardly downwardly from the front end. The upper side portion 602A is formed in a shape wherein it integrally includes a sideward covering portion 602A1 (FIG. 5) extending in the forward and backward direction in such a manner so as to cover a front accommodation box (accommodation case) 611 (FIG. 5) provided at a front portion of the vehicle body from the outer sides in the vehicle widthwise direction and a bottom covering portion 602A2 extending in the forward and backward direction in such a manner so as to cover the front accommodation box 611 from below. In short, the upper side portion 602A is formed as a cover that covers the front accommodation box 611 from the sides and from below.

As shown in FIGS. 5 to 7, the lower side portion 602B and the lower leg shield 603 are formed in a shape wherein they extend rearwardly downwardly in a cross section of a shape of a flat plate extending in the vehicle widthwise direction. A floor mat (not shown) is disposed on an upper face of the lower side portion 602B and the lower leg shield 603 thereby to form the left and right step floors 68 (FIG. 1).

Figure 9:
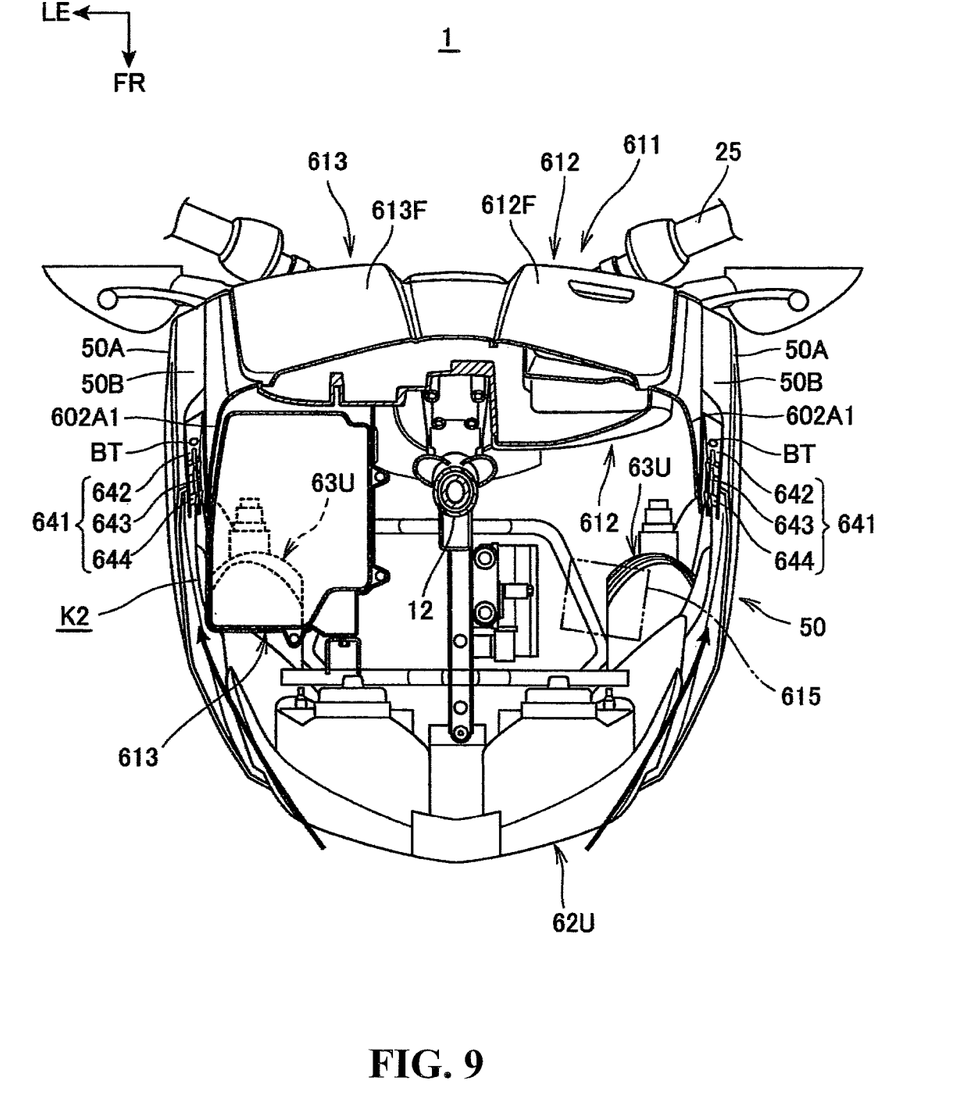
FIG. 9 is a sectional view taken along line IX-IX of FIG. 5.

FIG. 9 is a view showing the front accommodation box 611 together with peripheral components and corresponding to a cross section taken along line IX-IX of FIG. 5. The front accommodation box 611 has, on the left and the right of the head pipe 12, article accommodating portions 612 and 613 wherein an arbitrary article can be accommodated. The article accommodating portion 612 on the left side is formed as a large-sized accommodation box extending forwardly to the proximity of a rear face of a lamp unit 62U of the headlamp 62. A lamp unit 63U of the directional indicator 63 on the left side is disposed above the article accommodating portion 612. It is to be noted that lid members 612F and 613F are provided for the article accommodating portions 612 and 613, respectively, in the figure.

In addition, the article accommodating portion 613 on the right side is formed as an accommodation box having a length in the forward and backward direction smaller than that of the article accommodating portion 612 on the left side. An ABS modulator 615 for use with a brake system is disposed in a blank space between the article accommodating portion 613 and the lamp unit 62U below the lamp unit 63U of the directional indicator 63 on the right side. In this manner, from among the components in the front cover 50, the lamp unit 62U of the headlamp 62, left and right article accommodating portions 612 and 613 and ABS modulator 615 that are large-sized parts can be laid out compact.

As shown in FIGS. 6 and 7, left and right air guide paths K1, K1 are open between the front cover 50 and the upper inner cover 53 and introduce a flow of air (in the figures, a flow of a flow of air is indicated by arrows) from the front of the vehicle body from below the front cover 50 toward the upper inner cover 53. The lamp unit 62U of the headlamp 62 and the rear face of the lamp units 63U of the directional indicators 63, 63 are formed in such a shape that they are inclined rearwardly and upwardly so that the left and right air guide paths K1, K1 can be assured in a large size efficiently.

As shown in FIG. 9, the article accommodating portion 612 on the left side projects forwardly farther than the front cover 50 and forms an air guide path K2 that forms part of the air guide path K1 on the left side in front of the front cover 50.

In the present configuration, exhaust ports 641, 641 for rearwardly letting a flow of air from the front of the vehicle body introduced to the air guide paths K1 and K2 therethrough are provided at side end portions of the upper side portion 602A of the upper leg shield 602 that are the outer sides in the vehicle widthwise direction as shown in FIG. 9. The exhaust ports 641, 641 integrally include vertically elongated framework members 642, 642 provided on an upper edge of the upper side portion 602A and extending rearwardly and upwardly, single vertical fins 643, 643 extending in the upward and downward direction in the framework members 642, 642, and a plurality of horizontal fins 644, 644 extending in the leftward and rightward direction in the framework members 642, 642.

The exhaust ports 641, 641 are formed integrally on the upper inner cover 53 and are provided along an upper edge of the upper side portions 602A, 602A and are open rearwardly downwardly as shown in FIGS. 6 and 7. Also the horizontal fins 644, 644 are set rearwardly downwardly and can guide a flow of air introduced in the exhaust ports 641, 641 rearwardly and downwardly.

By setting the horizontal fins 644, 644 in the rearwardly downward direction, when the occupant RD (FIG. 1) positioned obliquely upwardly of the exhaust ports 641, 641 views the exhaust ports 641, 641, the line of sight of the occupant RD can be interrupted by the horizontal fins 644, 644. Consequently, the openings of the exhaust ports 641, 641 are less likely to be viewed by the occupant RD.

Further, by the provision of the vertical fins 643, 643, a flow of air W2 passing through the exhaust ports 641, 641 can be rectified into an arbitrary direction in the vehicle widthwise direction. Further, when the occupant RD or the like who gets off the motorcycle 1 views the exhaust ports 641, 641 from the outside of the vehicle, the line of sight of the occupant RD or the like is interrupted by the vertical fins 643, 643 and the openings of the exhaust ports 641, 641 can be less likely to be observed.

It is to be noted that the direction of the horizontal fins 644, 644 is not limited to the rearward downward direction but may be a horizontal direction or the like so that the horizontal fins 644, 644 can be prevented from being viewed by the occupant RD or the like if the direction is not a rear upward direction toward the occupant RD.

The framework members 642, 642 of the exhaust ports 641, 641 are formed in a framework shape such that they project forwardly upwardly from the upper side portion 602A, 602A as viewed in side elevation as shown in FIGS. 6 and 7. An upper plate 642A that configures an uppermost portion of the framework members 642, 642 is formed as a horizontal plate extending substantially horizontally in the forward and backward direction. Meanwhile, a lower plate 642B that configures a lowermost portion of the framework members 642, 642 is formed as a forwardly downwardly inclined plate that extends horizontally downwardly.

Figure 10:
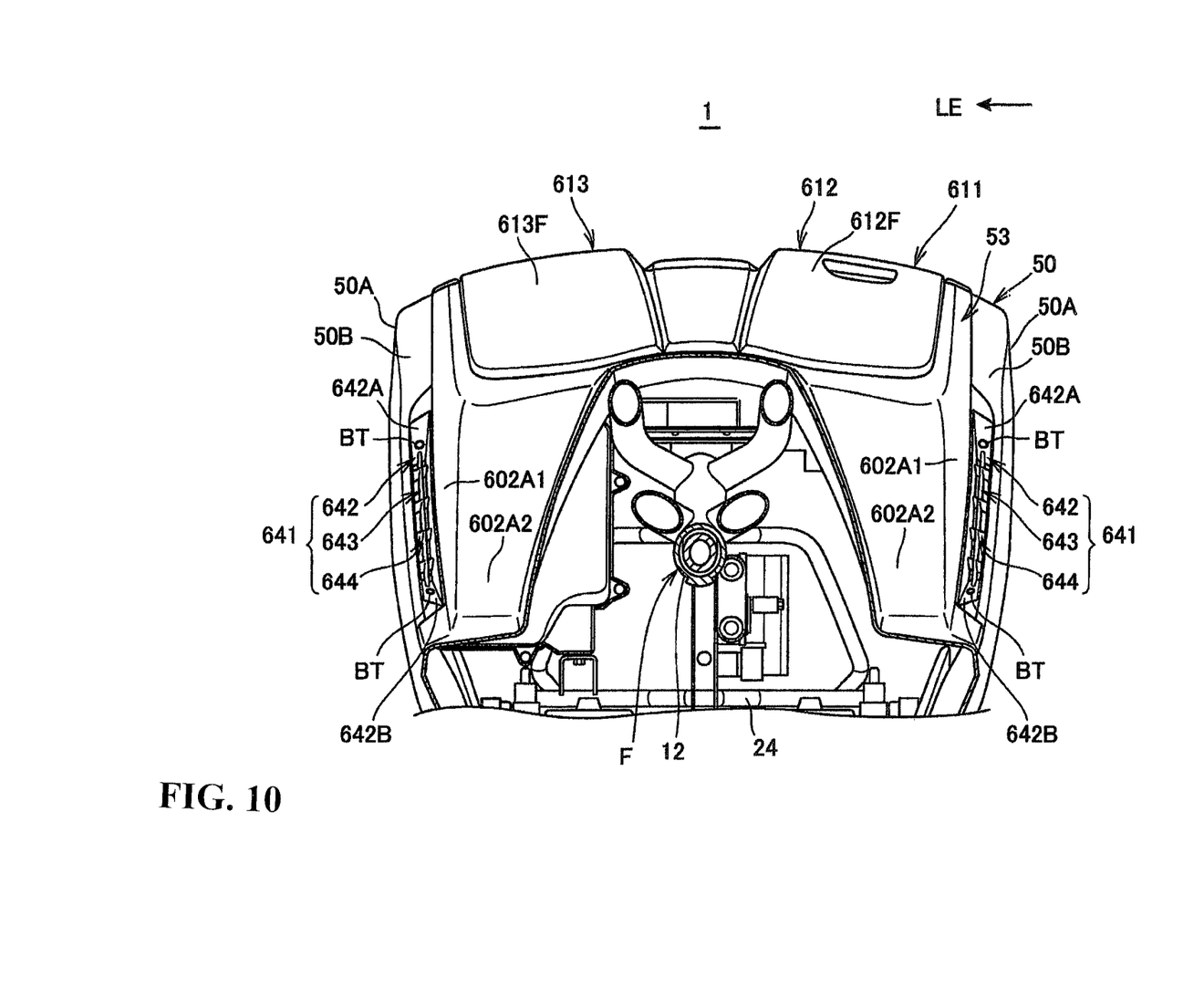
FIG. 10 is a view of an air outlet port as viewed obliquely from below together with peripheral components.

FIG. 10 is a view of the exhaust ports 641, 641 as viewed from obliquely below together with peripheral components. As shown in FIG. 10, only when the exhaust ports 641, 641 are viewed from obliquely downwardly, both of the upper plate 642A and the lower plate 642B can be visually confirmed, but from any other position, for example, from the occupant RD (refer to FIG. 1) seated on the seat 10, the upper plate 642A and the lower plate 642B cannot be visually confirmed.

On the upper plate 642A and the lower plate 642B, fastening portions (in the present configuration, bolt fastening portions) BT, BT for fastening the upper inner cover 53 having the exhaust ports 641, 641 and the front cover 50 put to the front of the upper inner cover 53 to each other are provided individually. Consequently, the exhaust ports 641, 641 can be utilized to fasten the upper inner cover 53 and the front cover 50 at a position at that they cannot be viewed from the occupant RD seated on the seat 10.

Further, the left and right exhaust ports 641, 641 are covered from the outer sides in the vehicle widthwise direction with the left and right wall portions 50A, 50A of the front cover 50 as shown in FIG. 10 and so forth. The left and right wall portions 50A, 50A of the front cover 50 have rear walls 50B, 50B having a predetermined width in the vehicle widthwise direction. As the rear walls 50B, 50B have a relief portion for relieving the left and right exhaust ports 641, 641, the left and right exhaust ports 641, 641 can be laid out in the rear walls 50B, 50B.

In this manner, the paired left and right exhaust ports 641, 641 can be provided with an appearance shape wherein they are embedded in the front cover 50 as shown in FIG. 8.

The action of the windbreak structure is described below.

As shown in FIGS. 6 and 7, a flow of air W1 flowing toward the front cover 50 during operation of the motorcycle 1 flows rearwardly upwardly along the front face of the front cover 50 and the windscreen 61. Thereupon, a flow of air W1 is partly introduced also to the rear face side of the windscreen 61 thereby to reduce a negative pressure generated behind the windscreen 61. Consequently, the upper body of the occupant RD positioned behind the windscreen 61 becomes less likely to be influenced by the negative pressure and receives suitable a flow of air. Thus, a comfortable operation of the vehicle may be obtained.

In addition, a flow of air W2 (FIGS. 6 and 7) flowing below the front cover 50 flows into the left and right air guide paths K1, K1 formed between the lamp unit 62U provided at a front lower portion of the front cover 50 and the upper inner cover 53. Then, the flow of air W2 passes the air guide path K2 (FIGS. 7 and 9) formed between the article accommodating portion 612 and the front cover 50 and is discharged rearwardly through the exhaust ports 641, 641 provided at the left and right side end portions of the upper inner cover 53.

Since the flow of air is discharged rearwardly through the exhaust ports 641, 641, the flow of air flowing on the left and right sides of the motorcycle 1 can be suppressed from being caught up to the inner side in the vehicle widthwise direction (to the occupant side). Consequently, the space below the feet of the occupant RD can be suppressed from entering a negative pressure state.

As shown in FIGS. 6 and 7, in the present configuration, sideward covering portions 602A1, 602A1 extending in the forward and backward direction in such a manner so as to cover the front accommodation box 611 from the outer sides in the vehicle widthwise direction are provided on the inner side in the vehicle widthwise direction of the left and right exhaust ports 641, 641. Therefore, the flow of air going out from the exhaust ports 641, 641 is smoothly guided rearwardly along the left and right sideward covering portions 602A1, 602A1.

In particular, the left and right sideward covering portions 602A1, 602A1 function as an exhaust air guide portion for guiding a flow of air going out from the left and right exhaust ports 641, 641 rearwardly. Consequently, the area wherein a catching up of a flow of air flowing on the left and right sides of the motorcycle 1 can be prevented can be expanded rearwardly.

Further, the sideward covering portions 602A1, 602A1 are formed as faces that come to the inner side in the vehicle widthwise direction toward the rear as shown in FIG. 9. Therefore, exhaust air can be introduced to the center side in the vehicle widthwise direction thereby to reduce the negative pressure in the proximity of the center.

Further, in the present configuration, since a space that is directed in the rearward downward direction is formed behind the exhaust ports 641, 641 by the upper leg shield 602 and the lower leg shield 603, a flow of air going out from the exhaust ports 641, 641 flows also rearwardly and downwardly. Consequently, the flow of air can expanded rearwardly and downwardly to flow. Therefore, the area wherein a catching up of a flow of air can be prevented can be expanded also upwardly and downwardly, and a windshield effect can be achieved over a wide range for the lower body of the occupant RD seated on the seat 10 including the feet.

Since the area wherein a windshield effect is obtained behind the leg shield 601 (upper leg shield 602 and lower leg shield 603) is expanded rearwardly and upwardly and downwardly in this manner, the area can be expanded also to the passenger seated on the rear seat 10B in addition to the occupant RD seated on the front seat 10A. Consequently, with the present configuration, it is possible to achieve a windshield effect for the upper body side of the occupant RD by the windscreen 61 side and achieve a sufficient windshield effect for the lower body of the occupant RD by the leg shield 601 and the exhaust ports 641, 641.

As described above, according to an embodiment of the present embodiment, the exhaust ports 641, 641 for letting a flow of air from the front of the vehicle body rearwardly are provided on the side end portions of the leg shield 601 that covers the feet of the occupant RD from the front (FIG. 1), and the sideward covering portions 602A1, 602A1 (FIGS. 6 and 7) that serve as an exhaust air guide portion extending rearwardly on the inner side in the vehicle widthwise direction of the exhaust ports 641, 641. Therefore, the area wherein a catching up of a flow of air can be prevented can be expanded rearwardly, and a windshield effect behind the leg shield 601 can be raised further.

Further, the front accommodation box (accommodation case) 611 is provided on the inner side in the vehicle widthwise direction of the exhaust ports 641, 641, and the front accommodation box 611 protrudes rearwardly farther than the exhaust ports 641, 641 and the vehicle body cover C that covers the front accommodation box 611 from the outer side configures the exhaust air guide portion (sideward covering portions 602A1, 602A1). Therefore, the vehicle body cover C that covers the front accommodation box 611 from the outer side can be used also as an exhaust air guide portion, and the exhaust air guide portion can be provided without increasing the number of parts.

Further, the front accommodation box 611 protrudes forwardly farther than the exhaust ports 641, 641, and the air guide path K2 (FIG. 9) for introducing a flow of air to the exhaust ports 641, 641 is formed from the side walls of the front accommodation box 611 and the vehicle body cover C. Therefore, an air guide path can be formed readily making use of the gap formed between the front accommodation box 611 and the vehicle body cover C.

Further, in the present configuration, the leg shield 601 has a V-shape expanded upwardly and downwardly toward the rear as viewed in side elevation as seen in FIGS. 6 and 7, and the exhaust ports 641, 641 are provided in the upper side portion 602A of the leg shield 601 extending rearwardly upwardly to form a space that is directed downwardly behind the exhaust ports 641, 641. Consequently, a flow of air going out from the exhaust ports 641, 641 can be expanded rearwardly downwardly to flow rearwardly, and a windshield effect can be expanded upwardly and downwardly.

Further, in the present configuration, the fastening portions BT, BT (FIG. 10) for fastening the leg shield 601 and the front cover 50 that is the vehicle body cover C on the front face side of the leg shield 601 are provided on the exhaust ports 641, 641. Therefore, the fastening portions BT, BT can be disposed so as not to be conspicuous and can be made less likely to be viewed from the occupant RD.

Further, the lamp units 62U and 63U of the headlamp 62 and the directional indicator 63 are provided forwardly of the leg shield 601 and the rear face of the lamp units 62U and 63U is formed in such a shape that it comes upwardly toward the rear as shown in FIGS. 6 and 7. Therefore, the flow of air W2 (FIGS. 6 and 7) from the front of the vehicle body can be guided to flow rearwardly of the lamp units 62U and 63U and can be guided smoothly to the exhaust ports 641, 641 positioned rearwardly of the lamp units 62U and 63U.

Further, since the vertical fins 643, 643 (FIG. 5) are provided on the exhaust ports 641, 641, it is possible to rectify the flow of air W2 (FIGS. 6 and 7) that passes the exhaust ports 641, 641, to an arbitrary direction in the vehicle widthwise direction. Also it is possible to make the openings of the exhaust ports 641, 641 less likely to be viewed from the left and right sides of the motorcycle 1.

The embodiment described above presents one mode of the present invention to the end and can be modified and applied without departing from the subject matter of the present invention.

For example, while, in the embodiment described hereinabove, the exhaust ports 641, 641 are provided at the side end portions of the upper side portions 602A, 602A of the upper leg shield 602, the provision of the exhaust ports 641, 641 is not limited to this, but the exhaust ports 641, 641 may be provided at the side end portions of the lower side portions 602B, 602B. Or, not one but a plurality of exhaust ports 641, 641 may be provided on each of the left and the right side portions.

Figure 11:
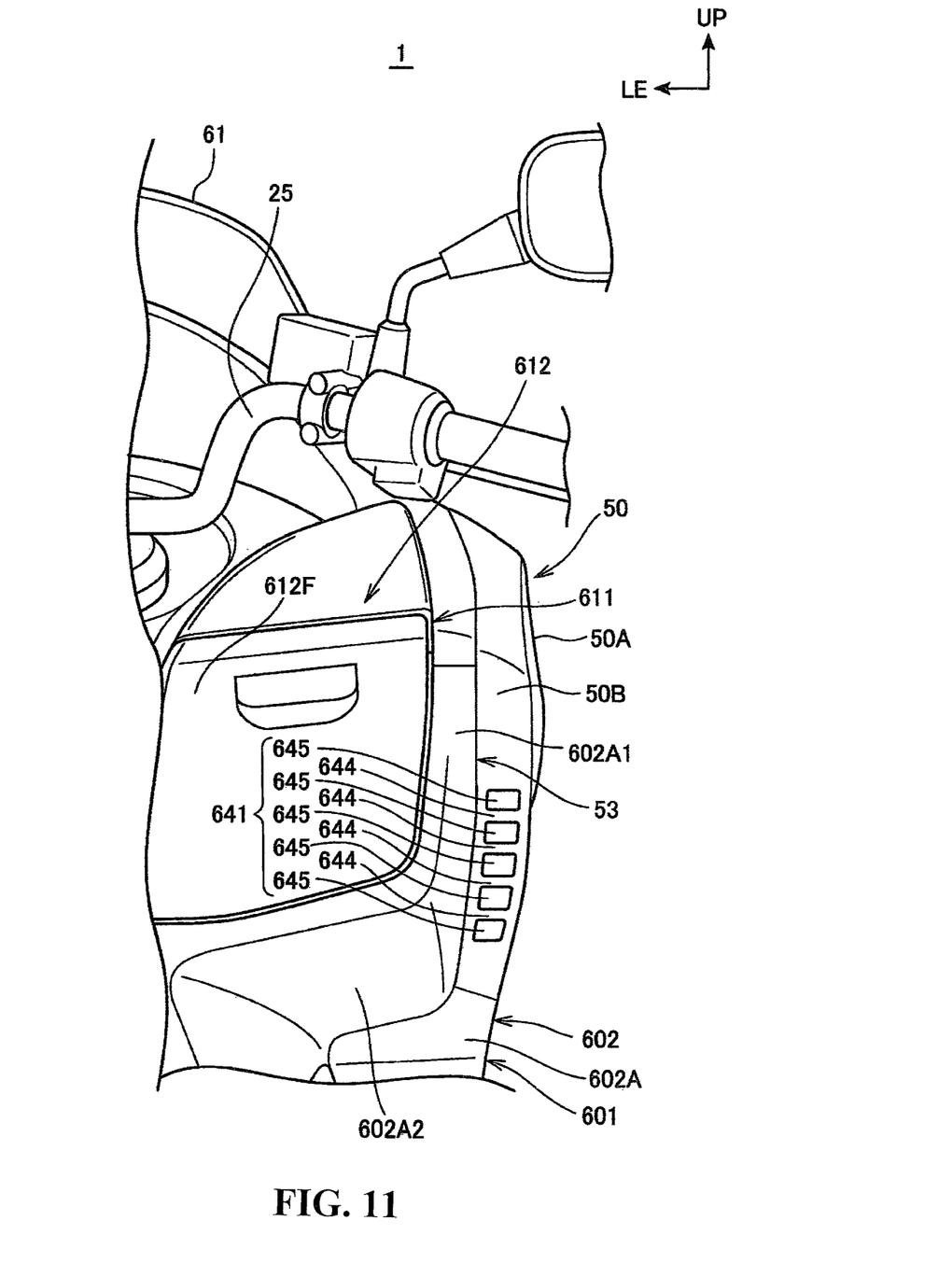
FIG. 11 is a view showing an air outlet port of a modification together with peripheral components.

Further, while, in the embodiment, the exhaust ports 641, 641 are provided integrally on the upper inner cover 53, the provision of the exhaust ports 641, 641 is not limited to this, but what is important is that the exhaust ports 641, 641 may be provided at side end portions of the leg shield 601. For example, where the exhaust ports 641, 641 are provided integrally on the front cover 50, a plurality of openings 645 may be formed in an upwardly and downwardly spaced relationship from each other in the rear walls 50B, 50B of the front cover 50 and a portion positioned between the openings 645 may be formed as horizontal fins 644 as illustrated in FIG. 11. With this configuration, the exhaust ports 641, 641 can be provided making use of the front cover 50, and by forming the portion positioned between the openings 645 as the horizontal fins 644, the air direction can be set to an arbitrary direction.

Furthermore, the present invention can be applied not only to the motorcycle 1 but also to saddle type vehicles in addition to motorcycles. It is to be noted that a saddle type vehicle includes general vehicles of the type wherein a rider sits astride the vehicle body and particularly includes not only motorcycles (including bicycles with motor) but also three-wheeled vehicles or four-wheeled vehicles classified into an ATV (All Terrain Vehicle).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A windbreak structure for a saddle vehicle including a leg shield for covering feet of an occupant from a front of the vehicle, the windbreak structure comprising:
   an exhaust port for letting a flow of air from a front of a vehicle body rearwardly provided at a side end portion of the leg shield; and
   an exhaust air guide portion that extends rearwardly provided on an inner side in a vehicle widthwise direction of the exhaust port for guiding air to flow rearwardly;
   wherein a windshield effect provided behind the leg shield, and
   wherein the leg shield has a V-shape and includes an upper side portion with a lower side surface sloping upwardly from a bottom of the V-shape toward a rear of the vehicle as viewed in a side elevation of the vehicle body, and
   wherein the exhaust port is formed as a space that is provided exclusively on the upper side portion of the V-shaped leg shield.

2. The windbreak structure for a saddle vehicle according to claim 1, wherein the windbreak structure further comprises:
an accommodation case provided on the inner side of the exhaust port in a vehicle widthwise direction, said accommodation case protruding further rearwardly than the exhaust port, and
a vehicle body cover having left and right sideward covering portions for covering the accommodation case from left and right sides of the vehicle,
wherein the exhaust air guide portion includes left and right exhaust air guide portions arranged on the left and right sideward covering portions of the vehicle body cover.

3. The windbreak structure for a saddle vehicle according to claim 2, wherein the accommodation case protrudes further forwardly than the exhaust port, and
an air guide path for introducing a flow of air to the exhaust port is formed by a side wall of the accommodation case and the vehicle body cover.

4. The windbreak structure for a saddle vehicle according to claim 3, wherein the windbreak structure further comprises:
a fastening portion provided on the exhaust port for fastening the leg shield and the vehicle body cover on a front face side of the leg shield to each other.

5. The windbreak structure for a saddle vehicle according to claim 3, wherein the windbreak structure further comprises:
lamp units of a headlamp and a directional indicator provided in front of the leg shield and having a rear face projecting upwardly toward a rear of the vehicle.

6. The windbreak structure for a saddle vehicle according to claim 2, wherein the leg shield having the V-shape also includes:
a lower side portion with an upper side surface sloping downwardly from the bottom of the V-shape toward the rear of the vehicle as viewed in the side elevation of the vehicle body, and
wherein the lower side portion with the upper side surface is directed downwardly behind the exhaust port.

7. The windbreak structure for a saddle vehicle according to claim 2, wherein the windbreak structure further comprises:
a fastening portion provided on the exhaust port for fastening the leg shield and the vehicle body cover on the front face side of the leg shield to each other.

8. The windbreak structure for a saddle vehicle according to claim 2, wherein the windbreak structure further comprises:
lamp units of a headlamp and a directional indicator provided in front of the leg shield, and having a rear face projecting upwardly toward a rear of the vehicle.

9. The windbreak structure for a saddle vehicle according to claim 2, wherein the windbreak structure further comprises:
a vertical fin provided on the exhaust port.

10. The windbreak structure for a saddle vehicle according to claim 1, wherein the leg shield having the V-shape also includes:
a lower side portion with an upper side surface sloping downwardly from the bottom of the V-shape toward the rear of the vehicle as viewed in the side elevation of the vehicle body, and
wherein the lower side portion with the upper side surface is directed downwardly behind the exhaust port.

11. The windbreak structure for a saddle vehicle according to claim 10, wherein the windbreak structure further comprises:
lamp units of a headlamp and a directional indicator provided in front of the leg shield, and having a rear face projecting upwardly toward a rear of the vehicle.

12. The windbreak structure for a saddle vehicle according to claim 1, wherein the windbreak structure further comprises:
a fastening portion provided on the exhaust port for fastening the leg shield and the vehicle body cover on the front face side of the leg shield to each other.

13. The windbreak structure for a saddle vehicle according to claim 1, wherein the windbreak structure further comprises:
lamp units of a headlamp and a directional indicator provided in front of the leg shield, and having a rear face projecting upwardly toward a rear of the vehicle.

14. The windbreak structure for a saddle vehicle according to claim 1, wherein the windbreak structure further comprises:
a vertical fin provided on the exhaust port.

15. A windbreak structure for a saddle vehicle comprising:
a vehicle body;
a leg shield operatively connected to the vehicle body for covering feet of an occupant from a front of the vehicle body;
an exhaust port for enabling a flow of air from the front of the vehicle body rearwardly, said exhaust port being provided at a side end portion of the leg shield; and
an exhaust air guide portion extending rearwardly on an inner side in a vehicle widthwise direction of the exhaust port for enabling a flow of air rearwardly;
wherein an area of catching up of the air is prevented to provide a windshield effect behind the leg shield, and
wherein the leg shield has a V-shape and includes an upper side portion with a lower side surface sloping upwardly from a bottom of the V-shape toward a rear of the vehicle as viewed in a side elevation of the vehicle body, and
wherein the exhaust port is formed as a space that is provided exclusively on the upper side portion of the V-shaped leg shield.

16. The windbreak structure for a saddle vehicle according to claim 15, wherein the leg shield having the V-shape also includes:
a lower side portion with an upper side surface sloping downwardly from the bottom of the V-shape toward the rear of the vehicle as viewed in the side elevation of the vehicle body, and
wherein the lower side portion with the upper side surface is directed downwardly behind the exhaust port.

17. The windbreak structure for a saddle vehicle according to claim 15, wherein the windbreak structure further comprises:
a fastening portion provided on the exhaust port for fastening the leg shield and the vehicle body cover on the front face side of the leg shield to each other.

18. The windbreak structure for a saddle vehicle according to claim 15, wherein the windbreak structure further comprises:
an accommodation case provided on the inner side of the exhaust port in a vehicle widthwise direction, said accommodation case protruding further rearwardly than the exhaust port, and
a vehicle body cover having left and right sideward covering portions for covering the accommodation case from left and right sides of the vehicle and wherein the exhaust air guide portion includes left and right exhaust air guide portions arranged on the left and right sideward covering portions of the vehicle body cover.

19. The windbreak structure for a saddle vehicle according to claim 18, wherein the accommodation case protrudes further forwardly than the exhaust port, and an air guide path for introducing a flow of air to the exhaust port is formed by a side wall of the accommodation case and the vehicle body cover.

20. The windbreak structure for a saddle vehicle according to claim 15, wherein the leg shield having the V-shape also includes:

a lower side portion with an upper side surface sloping downwardly from the bottom of the V-shape toward the rear of the vehicle as viewed in the side elevation of the vehicle body, and the lower side portion with the upper side surface is directed downwardly behind the exhaust port.

* * * * *